3,346,663
PROCESS FOR THE PRODUCTION OF POLYOXYMETHYLENES

Werner Kern and Volker Jaacks, Mainz (Rhine), Germany, assignors to Deutsche Gold- und Silber-Scheideanstalt vormals Roessler, Frankfurt am Main, Germany
No Drawing. Filed Aug. 26, 1960, Ser. No. 52,051
Claims priority, application Germany, Aug. 29, 1959, D 31,399; Mar. 10, 1960, D 32,823, D 32,824; May 13, 1960, D 33,328
7 Claims. (Cl. 260—823)

The present invention relates to a novel process for the production of polyoxymethylenes.

One of the objects of the present invention is to produce thermally and chemically stable polyoxymethylenes.

Another object of the invention is to use monomeric formaldehyde and/or lower oligomers such as trioxane as the starting material for the production of thermally and chemically stable polyoxymethylenes and copolymerized polyoxymethylenes.

A further object of the present invention is to produce polymers and copolymers of formaldehyde and/or lower oligomers such as trioxane having thermal properties which will permit their use in high temperature plastic forming processes.

Generally the objects of the present invention are accomplished by polymerizing and copolymerizing formaldehyde and/or lower oligomers such as trioxane in the presence of compounds having the structural unit

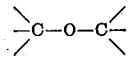

at least once in their molecular structures. These compounds, in the present invention, act as chain transfer agents and copolymerizing compounds.

PRIOR ART

The art is aware of many different procedures for producing polyoxymethylenes by polymerizing monomeric formaldehyde or the lower molecular weight oligomers of formaldehyde, such as trioxane. Among these procedures there is, for example, the technique of polymerizing monomeric formaldehyde in an inert, organic solvent under substantially water free conditions using ionic polymerization initiators such as aliphatic or aromatic amines (U.S. 2,768,994 and H. Staudinger and W. Kern, "Die hochmolekularen organischen Verbindungen, 1932, pages 280–287) and quaternary ammonium salts or triphenyl phosphine (British Patent 796,863); as well as the technique of polymerizing trioxane with the aid of ionic catalysts such as antimony trifluoride, zinc fluoride, hydrofluoric acid, etc. (U.S. 2,795,571).

The polyoxymethylenes produced by these prior art processes have molecular weights between 5000 to 500,000 depending upon the special reaction conditions employed in the respective processes. These polymers are thermally and chemically unstable. Analytical tests of these prior art polymers have shown that their chain structures are formed of recurring . . . —CH₂—O— . . . units and that the ends of the chains always contain OH groups.

Because of their structure, the macromolecular polymers depolymerize under various conditions fairly readily and this decomposition of the polymer will occur when the polymer is subjected to one of three different environmental conditions and/or chemical attacks.

THERMAL DECOMPOSITION

The first of such conditions arises when these polymers, containing hydroxyl groups on the ends of their chains, are subjected to a temperature of 150° C. and higher as would occur when these polymers are being shaped in plastic extrusion or pressing operations. At these temperatures a rapid splitting off of monomeric formaldehyde from one or both ends of the chain occurs in a type of slide fastener or zipper opening reaction, analogous to the thermal decomposition of low molecular weight semi-acetals into aldehydes and alcohols, which leads to the decomposition of the entire macromolecule.

In order to prevent this thermal decomposition of the ends of the chains and the entire chain thereafter and to produce a polymer which can be successfully processed in, for example, plastic pressure molding operations, different procedures have been proposed. These procedures usually involved furnishing the unstable polyoxymethylene glycol chains with thermally stable end groups in a subsequent, separate operation. This was generally accomplished by treating the hydroxyl end groups with suitable reagents that would either block off the hydroxy groups to a certain degree or would transform the hydroxyl groups into relatively, much more heat stable end groups. H. Staudinger and W. Kern, supra, successfully transformed the hydroxyl end groups of polyoxymethylenes into thermally stable ether and ester end groups. U.S. 2,512,950 discloses the etherification of polyoxymethylenes with alcohols in the presence of sulfuric acid and Belgian Patent 570,884 discloses the etherification of the hydroxyl groups of polyoxymethylenes with aliphatic acetals in acidic solutions. British Patent 770,717, furthermore, discloses the esterification of the hydroxyl groups on the end of the polyoxymethylene chains with acid anhydrides such as acetic acid anhydride in order to produce thermally stable polyoxymethylenes.

In all these above-mentioned prior art processes, however, the transformation of the hydroxyl end groups of the polyoxymethylenes into thermally stable end groups entailed an additional operation after the polymer, itself, was first produced in a prior, separate operation. Processes of this type, therefore, involve the expenditure of a great deal of time, effort and expense.

British Patent 796,863, on the other hand, discloses a process whereby at least partially heat stable end groups are formed concurrently with the formation of polyoxymethylenes from monomeric formaldehyde in the presence of catalysts by means of a so-called chain transfer agent. The chain transfer principle has been known to the art for some time in regard to, for example, polymerization reactions which proceed according to a radical forming mechanism such as in the case of the polymerization of styrene in the presence of carbon tetrachloride. By means of such a chain transfer reaction, polystyrenes of relatively low molecular weights were obtained which had chloride containing end groups. In a similar manner chloroform acts as a chain transfer agent in the polymerization of ethylene.

Since the polymerization of formaldehyde does not proceed as a radical forming mechanism, but rather on the basis of an ionic mechanism, only such substances can be used in the process of British Patent 796,863, as chain transfer agents, as are susceptible to an ionic attack. This British patent also discloses that such ionic chain transfer agents can be used to regulate the molecular weight of the polyoxymethylenes produced by the polymerization of monomeric formaldehyde. However, these chain transfer agents are active, according to this patent, only when present during the polymerization of monomeric formaldehyde and they will not react with the polymeric formaldehyde after it is formed. As more of these transfer agents are present, quantity wise, during the polymerization process, then more transfer reactions can take place in the end groups of the polymer chains that are forming and thus the average polymer chain will be shorter and the average molecular weights will be smaller than if less or no chain transfer agent were used. British Patent 796,863 discloses the use of organic acids, esters, alcohols, acid anhydrides, carbonates, amides and other compounds as chain transfer agents for use with monomeric formaldehyde. The common characteristic of these compounds is their reactability with Grignard reagents. This patent also discloses that some compounds which do react with Grignard reagents, are not suitable for use as chain transfer agents and they include water, methanol and formic acid.

DECOMPOSITION BY AUTO-OXIDATION

Polyoxymethylenes will also decompose in the presence of oxygen, usually at elevated temperatures, by means of an auto-oxidation reaction mechanism. Thus, this type of decomposition reduction will set in at temperatures over 160° C. and regardless of the type of end groups that are present on the polyoxymethylene chains. Upon being exposed to light, the prior art polyoxymethylenes will be subjected to the same auto-oxidative type of decomposition reaction at lower temperatures.

It is assumed, as far as the mechanics of this auto-oxidation type decomposition reaction are concerned, that the radical of an intermediate methylene group in the polymer chain is attacked and the polyoxymethylene chain is then broken apart at this point. The two resulting broken pieces of the chain are unstable and rapidly depolymerize to monomeric formaldehyde.

The auto-oxidative decomposition of polyoxymethylenes can be readily avoided, in a known manner, by the addition of anti-oxidants to the polymer compositions. These anti-oxidants have also been used for stabilizing other polymers for a long time.

DECOMPOSITION BY HYDROLYSIS

The third form of decomposition to which polyoxymethylenes are susceptible is by means of a hydrolysis reaction. The polyoxymethylene chain can be split into two pieces by acid hydrolysis (acidolysis). If an intermediate acetal compound ever appears on the chain by reason of an acid hydrolysis reaction then the resulting unstable chain pieces, in turn, quickly depolymerize to monomeric formaldehyde.

Up to the present time, there is no known protection against an acidolysis induced decomposition of polyoxymethylenes.

The same applies for a hydrolysis decomposition induced by aqueous solutions of alkaline materials. While polyoxymethylene-diethers are stable against alkalies polyoxymethylene esters also still have the disadvantage of being susceptible to attack by alkaline hydrolysis. Upon saponification of the ester group of such a polymer, rapid depolymerization of the entire chain follows.

THE PRESENT INVENTION

The objects of the present invention are obtained, generally speaking, as mentioned above, by polymerizing water free, monomeric formaldehyde and/or oligomers such as trioxane under essentially water free conditions in the presence of catalysts and with the aid of chain transfer agents which contain the structural unit

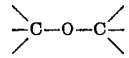

at least once in their structures. "Under essentially water free conditions" means that the entire reaction system should contain less than 3% water, preferably less than 1% and most preferably less than 0.1%. The catalysts to be used in the present invention are any of those which are known to be usable as formaldehyde and/or oligomer polymerization catalysts. For example, when polymerizing monomeric formaldehyde, ionic catalysts such as amines and quaternary phosphonium and ammonium compounds can be used and when polymerizing trioxane type polymers cationic catalysts such as Lewis acids and Friedel-Crafts catalysts can be used. Catalysts of these types are disclosed in the following patents: U.S. 2,828,286; German 962,116; German Auslegeschrift 1,037,286 and British Patents 796,862; 793,673; 766,629; 753,299 and 748,836. Within the scope of the present invention, some of the compounds disclosed herein as chain transfer agents, are only used with oligomers such as trioxane while others are used with both monomeric formaldehyde and the oligomers.

Structurally, the chain transfer agents of the present invention fall into three classes, generally. The class I compounds cover those compounds which contain one such structural unit,

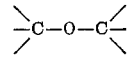

in a non-cyclic ararngement. These class I compounds are only used, within the scope of the present invention, with oligomers such as trioxane. Class II and class III compounds are used with both monomeric formaldehyde and oligomers such as trioxane. The class II compounds include compounds which contain at least one such structural unit,

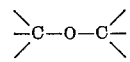

in a cyclic arrangement and also contain at least one —C—C— bond in the hetero cyclic structure. The class III compounds include those polymeric materials which contain more than one such structural unit,

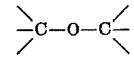

and have a degree of polymerization of at least 10.

The use of these various classes of compounds in the process of the present invention produces various types of polyoxymethylenes which have correspondingly different properties in regard to their stability under attack by heat and/or oxidation and/or hydrolysis. The most stable products are obtained by the combination of a chain transfer reaction and a copolymerization reaction such as by the concurrent use of a chain transfer agent such as diethyl formal and a comonomer such as dioxolane with either trioxane or formaldehyde. The use of each of these various classes of compounds in the present invention will be taken up in turn and the properties of the various polymers produced thereby will also be discussed.

The addition of these various types of chain transfer agents can be so supervised that the molecular weight of the polymers produced can be feasibly regulated generally. If relatively high concentrations of these chain transfer agents are used comparatively lower molecular weight polymers are obtained which have a molecular weight of about 2000. On the other hand if higher concentrations of the chain transfer agents are used polymers are obtained which have a molecular weight of 50,000 or more. However, when class II compounds are used, the quantities of them that are used do not have a critical effect on the molecular weight of the polymers produced because of the particular mechanics of the copolymerization reaction involved.

The yields obtained by the process of the present invention are almost entirely dependent upon the duration of the polymerization reaction so that it is conceivably possible to conduct the polymerization until almost quantitative yields are obtained.

The polymerization process of the present invention can be conducted in an inert organic solution or it can be conducted as a bulk polymerization process. Basically the solvents that can be used are aliphatic and aromatic hydrocarbons such as benzene, toluene, xylene, cyclohexane, hexane, heptane and petroleum ether. In addition aromatic nitro compounds such as nitrobenzene and halogenated hydrocarbons, in particular chlorinated hydrocarbons, for example, 1,2 ethylene chloride, methylene chloride, etc., but especially those which contain only one chlorine atom, are also very useful as solvents. These solvents can be used alone or in admixture with one another. When polymerizing monomeric formaldehyde in the present invention, in a solvent, ethyl ether is the preferred medium. When polymerizing trioxane, however, it is preferable to use molten trioxane and conduct a bulk polymerization process.

The height of the polymerization temperature has no important influence on the success of the polymeriaztion reaction. At higher temperatures, however, the polymerization reaction will proceed more swiftly. It is also often advantageous to use higher temperatures in order to be able to work with a homogeneous mixture of the reactants. In general the polymerization reaction of the present invention can be carried out at a temperature between —100° C. and +160° C. Unless otherwise indicated, the reaction temperatures used in the examples disclosed in the present application are room temperatures.

CLASS I COMPOUNDS

It has been found, by the process of the present invention, that the polymerization of water free trioxane in the presence of a polymerization catalyst under essentially water free conditions with the aid of a chain transfer compound selected from the group of class I compounds as herein disclosed will produce polyoxymethylenes, the length of the chain of which can be regulated during the polymerization process, which will contain end groups which are thermally and partially chemically stable. The chemical instability of the polymers will arise when the Group I compounds used bestow ester groups on the chain ends. These ester substituted polymers will decompose even at moderate temperatures when attacked by acids or alkalies. However, polymers produced using other Group I compounds, such as aliphatic ethers and acetals, with trioxane as the starting material will be both thermally and chemically stable. The thermal stability of these latter type polymers containing ether type, acetal end groups are particularly resistant to auto-oxidation type decompositions, even at very high temperatures (over about 170° C.). The resistance of these polymers to auto-oxidation attack can also be further enhanced by the addition thereto of known anti-oxidants such as are used for rubber, polyethylene and polypropylene.

The use of trioxane for the production of polyoxymethylenes, rather than monomeric formaldehyde, offers substantial technical advantages since trioxane is a solid material at room temperature and much easier to work with. A further advantage in using trioxane rather than formaldehyde as a starting material is the former's extremely slight water content. Furthermore, when using trioxane much higher polymerization temperatures can be used then are feasible with formaldehyde. It is very unexpected in view of the prior art that the class I chain transfer compounds of the present invention could be used, with the very good results obtained thereby, for the polymerization of trioxane, a polymer of formaldehyde.

The use of trioxane together with the Group I chain transfer agents of the present invention is also advantageous for the reason that the reactability of trioxane corresponds approximately to that of these Group I chain transfer agents. In this way a better utilization of the amount of the chain transfer agent present during the polymerization reaction results and the chain transfer agent does not have to be used, as is the case when polymerizing monomeric formaldehyde as in British Patent 796,863, in substantially excess quantities with respect to the intended effect.

The Group I chain transfer agents within the scope of the present invention which contain one

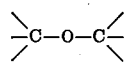

structural unit in their structure in a non-cyclic arrangement include:

(a) Ethers with aliphatic and aromatic radicals as well as cycloaliphatic and unsaturated ethers such as di-isopropyl ether, methyl benzyl ether, diallyl ether, dibenzyl ether, anisol, phenetol, diphenyl oxide, cyclohexyl methyl ether and butyl phenyl ether;

(b) All the acetals and ketals such as methylal, diethyl formal, diethyl formal and dimethyl ketal;

(c) Esters of organic acids such as ethyl acetate, methyl benzoate, ethyl propionate, ethyl formate, methyl propionate, isopropyl cinnamate and cyclohexyl valerate; and (d) Anhydrides of organic acids such as acetic acid anhydride, propionic acid anhydride, benzoic acid anhydride, butyric acid anhydride and cyclohexyl carboxylic acid anhydride.

These Group I compounds can be used as chain transfer agents either alone or in admixture with one another. The amount of the chain transfer agent to be added to the polymerization system depends upon whatever molecular weight is needed for the polyoxymethylenes in the particular case at hand. In general, 0.001 to 50% by weight based on the amount of trioxane used, of the chain transfer agent can be used in the polymerization system of the present invention. Quantities, however, outside this range can also be used without any undesirable detriment to the polymer produced arising. Any unreacted quantities of the chain transfer agent present in the polyoxymethylenes after the termination of the polymerization reaction can be removed and recovered again therefrom by suitable recovery procedures during the purification of the polymerizate. It is also possible, within the scope of the present invention, to use such reactants as would form the desired Group I chain transfer agent in the polymerization system under the prevailing polymerizing conditions. It is preferable to use, within the scope of the present invention, ionic catalysts for the polymerization catalysts. It is preferable, in this regard, to use such catalysts as are also suitable for use in Friedel-Crafts reactions.

The polymerization of trioxane type formaldehyde polymers with Group I chain transfer agents can be carried out between —100 and +150° C. The more preferable and advantageous operating temperatures, however, are between 0 and 100° C. Furthermore, this polymerization reaction can be conducted either with or without the use of a solvent. When the reaction is conducted in a solvent it is preferable to use, in this regard, essentially water free, inert, organic solvents, such as nitrobenzene, methylene chloride, hydrocarbons and the like. However, it is also possible to polymerize the trioxane in admixture with the polymerization catalyst and Group I chain transfer agent at higher temperatures without the use of a solvent.

The polymerizates are obtained in good yields. They can be purified, where necessary, to free them of lower molecular weight polymer fractions as well as residual quantities of the chain transfer agents and catalysts by washing them and extracting them with methanol and solutions of sodium hydroxide. The molecular weights of the polyoxymethylenes produced using trioxane and Group I chain transfer agents can be varied over a wide range by an appropriate regulation of the quantity of chain transfer agent present during the polymerization reaction. It is thus readily possible, by this procedure, to regulate the softening point of the polymers produced, at will.

The following examples are merely illustrative of the use of Group I chain transfer agents during the polymerization of trioxane and are not intended as a limitation upon the possible scope of use of Group I transfer agents in the process of the present invention.

Example 1

1000 parts by weight of water free trioxane were melted and mixed with 50 parts by weight of di-isopropyl ether. After the addition of 10 parts by weight of antimony pentachloride to this mixture the reactants were transformed almost quantitatively to a polyoxymethylene, which, after having the catalyst (SbCl$_5$) removed therefrom with an aqueous sodium hydroxide solution and after also adding thereto 2% by weight of phenyl-β-naphthyl amine, when subjected to a temperature of 180° C. lost only a few parts per thousand in weight per hour. The polyoxymethylene thus obtained was also not altered when treated with alkalies at elevated temperatures and also displayed a substantial stability against acids.

The reaction temperature was 70 to 80° C. and the duration of the polymerization was 10 to 15 minutes. The yield was 90%.

Example 2

50 parts by weight of water free trioxane and 3 parts by weight of diethyl formal were dissolved in 100 parts by weight of methylene chloride and then 1 part by weight of boron trifluoride etherate was added to the solution. A polyoxymethylene was thus formed, which, after being freed of residual quantities of the catalyst, chain transfer agents and lower molecular weight fractions by treatment with sodium hydroxide solutions and methanol, lost less than 1 part per thousand in weight per hour at a temperature of 180° C.

The polymerization reaction temperature was 20° C. and the duration of the reaction was 1 hour. The yield was over 90%.

Example 3

9 g. of fractionally distilled ethyl acetate and 100 g. of pure, essentially water free trioxane were dissolved in 200 ml. of essentially water free trioxane at 30° C. 50 ml. of a 10% solution of boron trifluoride etherate in methylene chloride were then added to the former solution with vigorous stirring. After a polymerization time of a half hour the resulting insoluble polyoxymethylene powder was filtered from the reaction solution, washed with ethyl ether and thoroughly heated in ethyl ether to remove residual traces of the BF$_3$ initiator. The polymer, which was obtained in good yields was mixed with 2% phenyl-β-naphthyl amine and subjected to a thermal decomposition test in the air at 160° C. The test material quickly lost a portion of its weight. However, the remaining 70% (after a few hours at 160° C.) of the polymer only lost about 1% of its weight per day thereafter at 160° C.

Example 4

When diethyl phthalate was used instead of ethyl acetate in the reaction conditions of Example 3 a thermally stable polyoxymethylene was obtained which contained phthalate end groups.

Example 5

7 g. of freshly distilled acetic acid anhydride, which had been previously freed of the last traces of water and acetic acid by being treated with calcium hydride, were mixed with 200 ml. of essentially water free nitrobenzene and 100 g. of pure trioxane. The polymerization was initiated by the addition of 20 ml. of a 10% solution of boron trifluoride etherate in nitrobenzene and was allowed to continue for 50 minutes at 40° C. with stirring. 80 g. of polyoxymethylene diacetate were obtained by filtering the resulting polymer and washing it with ether.

After further treating the polymer by heating it with ethyl ether, the resulting, white, fine powdery polymer was mixed with 1% by weight of phenyl-β-naphthyl amine and tested for its thermal stability by heating it in the air at 180° C. During the first 30 minutes of the test the polymer lost 10% of its weight whereas for several days thereafter, at the same temperature, it only lost less than 1% of its weight per hour.

CLASS II COMPOUNDS

The class II compounds of the present invention, as mentioned above, are compounds which contain the structural unit

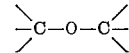

at least once in their structure in a cyclic arrangement and which also contain at least one carbon to carbon bond in their hetero cyclic structure. These compounds, in the present invention, can be used as chain transfer agents when both monomeric formaldehyde and oligomers such as trioxane are to be polymerized to form polyoxymethylenes under essentially water free conditions in the presence of a polymerization catalyst. The object of the use of these Group II chain transfer agents in the present invention is to prevent, by means of one polymerization technique, all three of the above described decomposition reactions from affecting the polyoxymethylenes produced thereby, if not completely then at least by limiting the possible effect of these three decomposition reactions to small segments of the polymer chains thereby attacked. The principle involved in the use of these Group II chain transfer agents consists in interrupting the sequence of acetal bonds.

( . . . —O—CH$_2$—O—CH$_2$—O—CH$_2$— . . . )

in the polyoxymethylene chain by interjecting therein —C—C— bonds at several places in the chain. This is accomplished by copolymerizing the monomeric formaldehyde or trioxane with suitable comonomers, in the form of Group II chain transfer agents.

Thus, if such a polyoxymethylene-polymethylene copolymer should subsequently start to decompose according to one of the three possible decomposition reactions, no matter whether by a thermal decomposition attack on the hydroxyl end groups of a polyoxymethylene glycol or by an auto-oxidation or hydrolysis attack upon an intermediate acetal group in the chain with the resulting slide fastener or zipper type decomposition of the remaining portions of the chains, then the decomposition reaction will be terminated as soon as the progressive splitting off of formaldehyde groups from the chain is stopped by the occurrence of a —C—C— bond in the chain structure. None of the three described types of depolymerization reactions can progress past such a —C—C— unit in the chain structure.

Whereas in the case of the homopolymeric polyoxymethylenes known to date, wherein the presence of a single hydroxyl end group susceptible to attack by heat or a single rupture of the polymer's chain at an intermediate point by means of an auto-oxidation or hydrolysis reaction was enough to lead to the decomposition of the entire polyoxymethylene chain, only a relatively small segment of the copolymer chains produced by the process of the present invention will undergo such a decomposition even though the polymer is subjected to one of the three, above described, possible reaction condition environments that lead to the destruction of the prior art polyoxymethylenes. The size of the segment of the chains of the polyoxymethylenes of the present invention that will decompose when the chain is subjected to attack, in one of the three described manners, will be inversely proportional to the number of comonomer groupings contained in the copolymer chain, that is, the higher the degree of copolymerization with the copolymer and the more comonomer units there are in the copolymer then the smaller will be the possible degree of decomposition.

For example, the analysis of the copolymer produced in Example 11 disclosed a comonomer (4-phenyl-1,3-dioxane) content of only 0.7 mol percent. The copolymer had a molecular weight of about 20,000, which corresponds to a degree of polymerization of about 650, in relation to its $CH_2O$ unit content. On the average, every copolymer chain also contained 4 comonomer units statistically distributed. On the average then, a thermal decomposition of the chain, from the hydroxyl end groups in, would only effect a fourth of the chain's length since the rest of the chain would lie between protective comonomer units. Thus, even though the hydroxyl end groups are not specially sealed off, 75% of the copolymer prepared in this example is thermally stable. By the same token, only one fourth of the polymer chains would be destroyed, on the average, if the copolymers produced in this example were subjected to attack by auto-oxidation or acidolysis, leading to the splitting of intermediate acetal bonds.

Those in the art can readily recognize that even with such a small comonomer content and such a comparatively small molecular weight that the copolymers that are produced by the process of the present invention, have a great advantage over homopolymeric polyoxymethylenes of a similar molecular weight.

A further important advantage of the method of stabilizing polyoxymethylenes of the present invention is that ready-made, stable polyoxymethylenes can be produced from the monomers or oligomers in one easy operational step.

Obviously, it is also possible, in addition to stabilizing the polyoxymethylenes by the present invention, to also introduce stable end groups on the copolymer chain by one of the prior art techniques suitable for such a purpose. This can be accomplished by the use of suitable polymerization chain transfer agents, such as acetals, which would also provide the copolymer, likewise in a single operation, with thermally and chemically stable ether end groups.

The desired mechanical and physical properties of the polyoxymethylenes of the present invention, as described above, can be obtained by incorporating about 1 mol percent or even less of the comonomer into the copolymer. Although such a comonomer content is normally sufficient for stabilizing the polyoxymethylenes, for certain fields of application as well as for modifying the physical properties of the polyoxymethylenes it can be advantageous to incorporate more of the comonomer units therein, for example, 10 mol percent, and even more.

The applicants have discovered a group of compounds among the great number of monomers known to the art, with which the above described principle of incorporating stable comonomer units into polyoxymethylenes can be realized. In this way, the thus stabilized polyoxymethylenes can be formed from monomeric formaldehyde as well as from trioxane or from a formaldehyde cleaving polymer of formaldehyde.

The comonomers contemplated in this variation of the process of the present invention involving compounds containing the structural unit

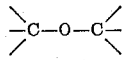

at least once in a cyclic arrangement and where at least one carbon to carbon bond must be present in the hetero cycle include:

(a) Cyclic ethers and acetals such as ethylene oxide, propylene oxide, glycide ether, styrene oxide, cyclohexene oxide, tetrahydrofurane, 1,3 dioxolane, 1,3 dioxane, 4-phenyl-1,3-dioxane, 1,3 dioxa cycloheptane, cyclo benzophenone glycol ketal and cyclo cyclohexanone glycol ketal;

(b) Lactones and cyclic esters such as β-propiolactone, γ-butyrolactone, δ-valerolactone and ethylene glycol carbonate; and (c) Cyclic carboxylic acid anhydrides such as phthalic acid anhydride; cyclic adipic acid anhydride, succinic acid anhydride and maleic acid anhydride.

Chemists working with lower molecular weight polymers know, in relation to cyclic compounds of the type listed above, that these ring structures can be readily opened by means of the ionic mechanics involved in various reactions, for example, by saponification. This is just what happens in the present invention wherein the hetero cyclic compounds are attacked by the growing polyoxymethylene ion and the cyclic structures are opened and are in turn united with the polyoxymethylene chain.

It is also possible, in a further variation of the process of the present invention, to add to the polymerization mixture such compounds, which, under the polymerization reaction conditions, would form the above enumerated cyclic compounds and these in turn by reacting with the growing polyoxymethylene chains would impart thermal and chemical stability thereto. The cyclic compounds themselves, or the compounds from which they can be formed in situ in the reaction system, are added in accordance with the requirements which are to be placed upon the finished polymerizate with reference to its stability.

This copolymerization reaction of the present invention can be carried out as a bulk polymerization reaction process but it is preferably conducted in an inert, organic solvent. It is possible to use monomeric formaldehyde as well as monomeric trioxane as the starting material. The purified, in particular essentially water-free, formaldehyde compound monomers and cyclic compound comonomers can be placed in the reaction vessel all at once or they can be continuously added to the reaction vessel during the course of the reaction. The ratio of the formaldehyde compound monomers (formaldehyde or trioxane) to the cyclic comonomers in the reaction mixture is so regulated that 0.1 to 50 mol percent and preferably 0.5 to 3 mol percent of the cyclic comonomer units are incorporated in the copolymer. The ratio of oxymethylene units to cyclic comonomer units in the polymer, of course, is not identical with the ratio of the monomers in the starting mixture. Since the comonomers are many times less reactable than formaldehyde and only partially as reactable as trioxane, a monomer mixture must be frequently used which is richer in cyclic comonomer content than the resulting copolymer is intended to be. The unreacted portions of the cyclic comonomer are reclaimed after the polymerization reaction has terminated.

In the copolymerization technique of the present invention such materials can be used as ionic polymerization initiators as have found use in the prior art in the homopolymerization of trioxane or formaldehyde. Among others, this would include, boron trifluoride, trimethyl amine, quaternary ammonium salts, phosphine and sulfur compounds containing the structural element

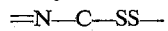

This copolymerization reaction can be conducted in the temperature range of −100° to +150° C. However, when using monomeric formaldehyde as the starting material in the form of a solution with inert, organic solvents it is expedient to conduct the polymerization in the formaldehyde saturated solution at lower temperatures within this range, for example, at about −60° C. It is also possible, however, particularly when using trioxane as the starting material, to work at room temperature or even at higher temperatures. The solvents contemplated for use in this copolymerization reaction technique are in general essentially water free, organic inert solvents, such as, toluene, nitrobenzene, methylene chloride, or benzine. The formaldehyde or trioxane monomer, purified of water as much as possible, and the cyclic comonomer additives of the present invention can be added to the reaction system, either all at once or continuously during the course of the reaction, with the aid of an inert carrier gas.

The recovery of the finished polymerizate follows the usual procedure. The various phases are separated mechanically and then the polymerizate is treated with purifying and washing agents such as aqueous solutions of sodium hydroxide and methyl alcohol. In this way residual quantities of the initiators and unreacted monomers are removed.

An additional advantageous stabilizing effect against auto-oxidation can be imparted to the polyoxymethylenes produced by this copolymerization reaction technique by the use of known anti-oxidants, such as phenyl-$\beta$-naphthyl amine, in the polymerization reaction.

The following examples are merely illustrative of the use of the copolymerization technique of the present invention and are not intended as a limitation upon the scope thereof.

*Example 6*

Water free monomeric formaldehyde was produced by the thermal decomposition of $\alpha$-polyoxymethylene and was thereafter dissolved in water free toluene at $-80°$ C. To 100 ml. of such a toluene solution containing about 6% formaldehyde, 12 g. of water free styrene oxide were added at $-80°$ C. and then nitrogen containing boron trifluoride was introduced into the solution for 1 minute.

The resulting polymer, which precipitated out, was filtered from the reaction solution, washed with ethyl ether and warmed in a 2 normal solution of sodium hydroxide to remove residual quantities of the initiator (BF$_3$). After repeated filterings and washings with water and acetone, a white, crystalline, high molecular weight copolymer was obtained which had a melting point of 166° C.

The polymerization reaction temperature was $-70$ to $-80°$ C. and the duration of the polymerization was 10–15 minutes.

When the same reactants were used in another test, except for the use of the styrene oxide, a homopolymeric polyoxymethylene was obtained which, in contrast to the copolymer obtained above, quickly and completely decomposed at temperatures over 160° C.

*Example 7*

Three parts trioxane and 1 part tetrahydrofurane were heated together with 0.5 mol percent of antimony trifluoride for 15 hours in a bomb tube at 100–110° C. In this way almost quantitative yields of a white, crystalline, non-sticky polymer were obtained. This polymer consisted essentially of a thermally stable copolymer of trioxane and tetrahydrofurane, which, after the addition of a trace of phenyl-$\beta$-naphthyl amine thereto, lost less than 1% in weight per hour at 180° C.

*Example 8*

20 g. of water free trioxane and 2.0 g. of 1,3-dioxolane were dissolved in 50 ml. of methylene chloride. The copolymerization reaction was initiated by the addition of pure, elemental iodine to the solution. After the system had stood at room temperature for 15 hours, 7 g. of the copolymer had formed which was recovered by filtering it from the reaction mixture and then washing and drying it. The melting point of this high molecular weight copolymer of trioxane and dioxolane was determined to be 146° C. When heated to 200° C. in a nitrogen atmosphere 12% of the copolymer quickly decomposed. The remainder was thermally stable and lost only 0.4% in weight per hour at 200° C. in a nitrogen atmosphere.

*Example 9*

8 g. of water free trioxane and 2 g. of $\beta$-propiolactone were dissolved in 10 ml. of methylene chloride at 20° C. A dilute solution of boron trifluoride etherate in methylene chloride was then slowly added to the trioxane in solution until the system had become turbid indicating that the copolymerization reaction had begun. After the termination of the reaction, the resulting copolymers were recovered by being filtered from the reaction system and were freed of boron trifluoride residues adhering thereto by heating the copolymers in diethyl ether.

The melting point of the copolymer thus obtained was about 120° C. It displayed, at much higher temperatures, a very good thermal stability, that is, after an initial, quick decomposition loss of 5% of its weight in the form of unstable portions of the copolymer chains, the remaining portions of the copolymer of trioxane and propiolactone (with 1% by weight of phenyl-$\beta$-naphthyl amine added as an anti-oxidant) displayed a loss of only 0.05% in weight per minute in the air at 180° C.

The duration of the polymerization reaction was a few hours.

*Example 10*

38.8 g. of water free trioxane and 6.5 g. of water free styrene oxide were dissolved in 100 ml. of dry nitrobenzene. To this solution, 0.50 mg. of boron trifluoride etherate dissolved in 10 ml. of nitrobenzene were added. A rapid polymerization resulted, which was terminated after a few minutes by the addition of methanol containing water. The resulting copolymers were thoroughly washed and dried. They were white, crystalline copolymers with a melting point of 153–154° C. An analysis disclosed that the copolymer had a comonomer (styrene oxide) content of 2.7 mols of styrene oxide per 100 mols of CH$_2$O. When tested for thermal stability properties at 200° C. under a nitrogen atmosphere, the copolymer was 70% thermally stable without any further treatment and after the initial losses its loss in weight per hour was less than 0.6% of its weight.

When trioxane is polymerized under similar conditions in the absence of the comonomer (styrene oxide) a completely thermally unstable polyoxymethylene is obtained.

*Example 11*

42 g. of water free trioxane and 16.8 g. of 4-phenyl-1,3-dioxane were dissolved in 100 ml. of nitrobenzene. Boron trifluoride etherate was used as the initiator for the polymerization. A copolymer was thus obtained, which after being purified in the usual manner, had a melting point of 158 to 160° C. and contained 0.7 mol percent (based on the copolymer's CH$_2$O content) of 4-phenyl-1,3-dioxane. The thermally stable portion of the copolymer amounted to 75.8% when the copolymer was heated to 200° C. under a nitrogen atmosphere. These stable portions lost less than 0.1% in weight per hour under the same heating conditions.

*Example 12*

10 g. of 4-phenyl-1,3-dioxane were added to 100 ml. of a water free, 6% solution of formaldehyde in toluene prepared as in Example 6. The polymerization reaction began at $-50$ C. without the addition of a polymerization initiator. However, the reaction was accelerated a great deal by the addition of a few cc. of a dilute aqueous solution of antimony pentachloride to the reaction system. 6 g. of a white, crystalline copolymer having a melting point of 156° C. was obtained after the usual filtering, washing and drying operations. This copolymer lost about 2% in weight per minute as a result of thermal decomposition when heated to 190° C. under a nitrogen atmosphere.

*Example 13*

10 g. of water free $\gamma$-butyrolactone were added to 10 ml. of a water free, 6% solution of formaldehyde in toluene, prepared as in Example 6, at a temperature of $-60°$ C. The polymerization reaction began without the addition of an initiator. The resulting copolymer was recovered using the usual filtering, washing and drying steps.

The crystalline copolymer melted at 155° C. to form a viscous, glass clear, colorless melt which even at still much higher temperatures exhibited a considerable thermal stability, for example, it lost only 2% in weight per minute at 190° C.

*Example 14*

The polymerization of 38 g. of trioxane and 5.4 g. of 1,2 propylene glycol carbonate, dissolved in 100 ml. of nitrobenzene, was initiated by the addition of 20 mg. of boron trifluoride etherate to the solution. After being recovered from the reaction system and purified in the usual manner, the resulting copolymer had a melting point of 161–162° C. When treated for thermal stability at 190° C. under a nitrogen atmosphere the copolymer initially lost 0.8% of its weight per minute. However, the loss in weight, under a continuation of the test heating conditions, soon diminished to the point where it only represented a fraction of the initial weight losses.

*Example 15*

50 parts by weight of water free trioxane and 3 parts by weight of 1,3-dioxa cyclic heptane were dissolved in 100 parts by weight of methylene chloride. One part by weight of boron trifluoride etherate was then added to the solution. A polyoxymethylene copolymer was thus formed, which after being recovered and purified, lost less than 1 part in a thousand in weight per hour at a temperature of 180° C.

*Example 16*

Monomeric, gaseous, water free formaldehyde was introduced into a water free solution of 3% by weight dioxolane and 0.5% by weight of triethyl isopropyl ammonium iodide in hexane. The resulting polyoxymethylene copolymer which precipitated from the solution had the same thermal and chemical stability as the copolymer produced in Example 15.

*Example 17*

When the cyclic formal 1,3-dioxa cycloheptane is used instead of the diethyl formal used in Example 2 then the copolymer obtained has thermal and chemical stability properties similar to the copolymer produced in Example 15.

*Example 18*

Monomeric, gaseous, water free formaldehyde was introduced into a water free solution of 3% by weight glycol formal and 0.5% by weight triethyl-isopropyl-ammonium iodide in hexane. The resulting copolymer, after the addition thereto of a small amount of triphenyl amine, lost only about 1 part per thousand of its weight per hour at 180° C.

CLASS III COMPOUNDS

The use of the class III compounds of the present invention as chain transfer agents in the polymerization of trioxane or monomeric formaldehyde results in the formation, in good yields, of thermally stable polyoxymethylenes which also have very high molecular weights.

As mentioned above, these class III compounds, according to the present invention, are low molecular weight polymers which contain more than one reactive

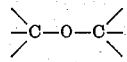

group in their structure and have a polymerization degree of at least 10 and they can be broadly broken down into four subclasses:

(1) Polymeric ethers such as polypropylene oxide and polyvinyl-isopropyl ether;
(2) Polymeric acetals which are thermally stable themselves, such as polyvinylbutyral;
(3) Polymeric esters such as polyvinyl acetate, polymethylmethacrylate, cellulose acetobutyrate, polycarbonates and polyethylene-terephthalate; and
(4) Polymeric anhydrides.

It is anvantageous, in carrying out the polymerization reaction of the present invention with Group III compounds, to so direct the course of the polymerization reaction by suitable choices of concentration ratios, solvents and operating temperatures that every polymeric chain transfer agent molecule undergoes as many chain transfer reactions as possible.

If, for example, three growing polyoxymethylene chains have been joined, independently and successively, to a polymethylmethacrylate molecule, then these three polyoxymethylene chains will have been bonded together through the polymethylmethacrylate molecule. Thus, the three growing polyoxymethylene chains become segments of a single, much larger molecule which can be designated as a Grafted copolymer having the following structure, termed Type A:

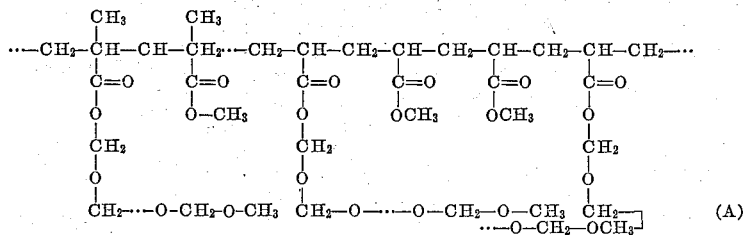

(A)

This Type A or branched copolymer, in which the polyoxymethylene chain segments are "grafted" as side chains on the polymeric chain transfer agent, the latter thereby acting as a principal chain, is always formed when the reactive

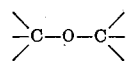

groups of the polymeric chain transfer agent are present in the latter's side chains as is the case where the polymeric chain transfer agent is, for example, polymethylmethacrylate, polyvinyl acetate, cellulose acetobutyrate or polyvinyl isopropyl ether.

If the reactive

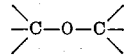

groups, however, are present in the principal chain of the polymeric chain transfer agent, as in the case of polyethylene terephthalate, polycarbonates, polyanhydrides, polypropylene oxide and the like, then a second type (B) of copolymer is formed, by means of a repeated chain tranfer reaction, which resembles a blocked copolymer as follows:

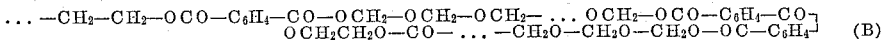 (B)

An unbranched linear copolymer is thus obtained in these Type B polymers in which polyoxymethylene segments alternate with polyester segments. The polyoxymethylene segments, which are thus protected by the polyester segments, are thermally stable.

There is still a third type of copolymer possible, using class III compounds as chain transfer agents, which are formed from monomeric formaldehyde or trioxane and a polycyclic chain transfer agent which contains ring shaped

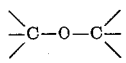

groupings. An example of such a polycyclic chain transfer agent is polyvinylbutyral. If this polymeric cyclic acetal is used in the polymerization of the formaldehyde compounds then a cross-linked insoluble and infusable copolymer is obtained. If, however, by means of appropriate reaction conditions, the number of polyoxymethylene chains, which link up with a single polyvinylbutyral molecule, for example, is kept relatively small on the average, then here also, with this type polymeric chain transfer agent, a thermally stable copolymer can be obtained, which, in turn, can be further processed by pressure molding techniques or worked with in the form of a solution.

According to the present invention, polymers having different degrees of polymerization can be used as the class III chain transfer agents, however, it is advantageous to use such polymers which have a degree of polymerization of at least 10.

Moreover, instead of using a homopolymeric chain transfer agent, such as polymethylmethacrylate, a copolymeric chain transfer agent can be used, for example, a copolymer of methylmethacrylate and styrene. The polymeric chain transfer agents, however, should not contain any, or at most, only very few, active hydrogen groups as are present, for example, in carboxyl groups, hydroxyl groups and acid amide groups, otherwise the chain transfer reaction during the trioxane or formaldehyde polymerization will take place with these active hydrogen containing groups and unstable hydroxyl end groups will form on the copolymer chain ends.

Either water free trioxane as well as water free formaldehyde can be used as the monomeric formaldehyde compound with the class III chain transfer compounds. The formaldehyde compound monomers can be charged into the reaction vessel all at once or they can be added continuously during the course of the reaction. The mixture ratio of formaldehyde compound monomer to polymeric chain transfer agent can be varied between 1:10 and 1:0.01 parts by weight.

The most favorable reaction temperatures lie between $-20°$ C. and $+160°$ C. However, the temperature to be used as well as the choice of solvent and reagent concentrations are largely determined by the solubility of the polymeric chain transfer agent. It is also advantageous to work under such reaction conditions that the product that is formed either remains in solution or only gradually precipitates out.

The polymerization of trioxane or formaldehyde with class III chain transfer agents can be started by initiators known to the art, such as, boron trifluoride or mineral acids. It is important, however, that the initiator that is used by completely removed from the copolymerizate after the termination of the reaction by processing the reaction product by filtering, washing with organic solvents and treating it with bases such as sodium bicarbonate solutions or dimethyl formamide.

It is expedient, of course, to further stabilize these copolymers by methods known to the art. This would involve, in particular, the addition of anti-oxidants, such as phenyl-$\beta$-naphthyl amine, which protect the copolymers from the effect of the oxygen in the air at higher temperatures.

The following examples are merely illustrative of the use of the class III chain transfer agents of the present invention and are not intended as a limitation upon the scope thereof.

*Example 19*

12 g. of water free trioxane and 1 g. of polyvinylbutyral were dissolved at 100° C. in 50 ml. of water free toluene. 180 mg. of boron trifluoride-etherate dissolved in 50 ml. of toluene were then added dropwise to the solution with stirring. After the termination of the polymerization reaction, the reaction mixture was cooled to room temperature. The resulting, white copolymer, which had precipitated out, was filtered off and washed with methanol, a hot soda solution and water. The soluble, grafted copolymer thus obtained melted at about 165° C. without noticeable decomposition to a clear liquid. It decomposed without further stabilization, when heated under a nitrogen atmosphere at 190° C. only up to about 1.0% of its weight per minute.

The duration of the polymerization reaction was 20 minutes.

If polyvinylbutyral is dissolved in molten trioxane in the ratio of 1:2 and polymerized therewith with BF$_3$ etherate then the reaction mixture will be quantitatively converted into a gummy type copolymerizate. This gummy copolymerizate, however, is completely cross-linked and is therefore insoluble as well as infusable. The temperature of the polymerization system was 70 to 80° C.

*Example 20*

20 g. of water free trioxane and 1 g. of polyethylene terephthalate were dissolved in 120 g. of water free nitrobenzene at 130° C. The polymerization reaction was initiated with 120 mg. of boron trifluoride etherate. After a 10 minute reaction period at 130° C. a copolymer was obtained which was recovered by filtering after the reaction system was cooled off. By a fractional recrystallization of the copolymerizate from hot dimethyl formamide it was determined that no significant quantities of homopolymers were present in the copolymerizate.

After a repeated dissolving and reprecipitation fractionation, the copolymer was analysed and found to contain 25% by weight of polyethylene terephthalate. This fraction had a melting point of 220 to 225° C. When melted, a portion of the grafted copolymer quickly decomposed. The larger portion however, exhibited an excellent thermal stability and was fabricated into mechanically formed bodies of high value.

*Example 21*

4 g. of the polycarbonate of 4,4'-dihydroxy phenyl-2,2-propane and 50 mg. of boron trifluoride-etherate were dissolved in 80 ml. of water free nitrobenzene. In the course of 15 minutes, at 110° C., 16 g. of water free trioxane were added to this solution. Finally, the entire system was stirred for another 15 minutes at 110° C. and then cooled. The resulting copolymerizate was removed by filtering and thoroughly washed with ethyl ether, methanol, water and acetone. As a further purification step, it was dissolved in and recrystallized from hot dimethyl formamide twice. 18 g. of a white, fine powdery and crystalline copolymer were thus obtained which melted at 125–130° C.

In order to compare the thermal stability of the grafted copolymer obtained above with a homopolymeric polyoxymethylene having a melting point of 180° C., the grafted copolymer, without being stabilized any further, was subjected to thermal decomposition conditions at 190° C. under a nitrogen atmosphere. The loss in weight for the copolymer at this high temperature amounted to 0.6% in weight per minute. As is known to those in the art, homopolymeric trioxane is normally quantitatively decomposed at 190° C. in about 30 minutes.

*Example 22*

4 g. of polymethylmethacrylate of intermediate molecular weight, 4 g. of water free trioxane and 100 mg. of boron trifluoride etherate were dissolved in water free nitrobenzene at 110° C. In the course of 20 minutes another 12 g. of trioxane and 100 mg. of boron trifluoride-etherate were successively added to the reaction system. After stirring the reaction mixture for another 10 minutes at 110° C., it was cooled and the copolymeric precipitate was thoroughly washed with methanol after being recovered by filtration and then heated with ethyl ether and dried.

The yield amounted to 1.4 g. of a white, crystalline grafted copolymer, the melting point of which was in the neighborhood of 140° C.

The rate of decomposition of this grafted copolymer, at 190° C. under a nitrogen atmosphere, for the first 30 minutes, amounted to, on the average, 1% of its weight per minute and thereafter it amounted to only about 0.1% of its weight per minute.

*Example 23*

9.5 g. of water free trioxane and 1.0 g. of polyvinyl acetate were dissolved in 50 ml. of water free toluene. The solution was then heated to 110° C. with stirring and a 10% solution of boron trifluoride etherate in toluene was added thereto dropwise until an advanced polymerization reaction was evidenced by the precipitating copolymer. This copolymer was filtered off, washed with water free methanol and ethyl ether and then dried. The yield of grafted copolymer was 3 g. This copolymer melted at 150° C. with a slight decomposition. A test portion of 200 mg. of this grafted copolymer was recrystallized from dimethyl formamide and subjected to thermal decomposition conditions at 190° C. under a nitrogen atmosphere. During the first hour the weight of the copolymer decreased about 85 mg., whereas during the next three hours its weight decreased, in all, about 30 mg.

FABRICATING FORMED BODIES

All the polyoxymethylenes produced by the process of the present invention, using class I, II and III chain transfer agents, can be processed into formed bodies by means of the commonly used thermoplastic techniques, such as, injection molding, pressing or rolling or they can be used for the coating of objects. When expedient, any of the reaction procedures of the present invention can be conducted in the presence of such materials as are known to the art which will improve the processing and/or stability and/or the mechanical properties of the formed bodies. Such auxiliary materials would include plasticizers and stabilizers which would not disturb the course of the polymerization reactions of the present invention.

In this way, formed bodies can be obtained which are tough and elastic, which are not decomposed by alkalies, which are very stable against acids and which depolymerize only to a trifling extent when heated to 180° C. for one hour.

Fillers and/or coloring agents such as glass fibers, mineral wool or preferably highly dispersed, active fillers, such as alkaline carbon black, oxides of metals or metalloids, such as aluminum oxide, titanium oxide, zirconium oxide or silicon dioxide, which were obtained by decomposing volatile compounds of these materials at higher temperatures in an oxidizing or hydrolyzing medium, can also be added to all the polymerizates of the present invention.

We claim:

1. A process for the production of polyoxymethylenes comprising polymerizing trioxane at a temperature between —20 and +160° C. under essentially water free conditions in the presence of a Lewis acid catalyst and at least one organic compound selected from the group consisting of polyvinyl acetate, polymethyl methacrylate, the polycarbonate of 4,4'-dihydroxy phenyl-2,2-propane and polyvinyl butyral, said polymeric compounds having a degree of polymerization of at least 10, the quantity of said organic compound being 0.001 to 50 parts by weight per 100 parts by weight of the trioxane.

2. A process as in claim 1 in which said trioxane is used in a molten state.

3. A process as in claim 1 in which said catalyst is boron trifluoride etherate.

4. A process as in claim 1 in which said polymerization is conducted in an inert, organic solvent.

5. A process as in claim 1 in which said polymerization is conducted in the presence of anti-oxidants.

6. A process as in claim 1 in which said polymerization is conducted as a bulk polymerization process.

7. A process as in claim 1 in which the ratio of the trioxane to said organic compound is between 1:10 and 1:0.01 parts by weight.

References Cited

UNITED STATES PATENTS

| | | | |
|---|---|---|---|
| 2,395,265 | 2/1946 | Gresham | 260—67 |
| 2,449,469 | 9/1948 | Gresham et al. | 260—215 |
| 2,884,561 | 7/1958 | Bechtold et al. | 260—874 |
| 2,966,476 | 12/1960 | Kralovec | 260—67 |
| 2,989,511 | 6/1961 | Schnizer | 260—67 |
| 3,002,952 | 10/1961 | O'Connor | 260—67 |
| 3,012,990 | 12/1961 | Kray et al. | 260—67 |
| 3,017,389 | 1/1962 | Langsdorf et al. | 260—67 |
| 3,026,299 | 3/1962 | Kray et al. | 260—67 |
| 3,027,352 | 3/1962 | Walling et al. | 260—67 |
| 3,087,913 | 4/1963 | Kray et al. | 260—67 |

FOREIGN PATENTS

| | | |
|---|---|---|
| 796,693 | 6/1958 | Great Britain. |
| 807,589 | 1/1962 | Great Britain. |

OTHER REFERENCES

Kern et al., Angewandte Chemie 73, No. 6, Mar. 21, 1961, pp. 177–224, ODI 25.

WILLIAM H. SHORT, *Primary Examiner.*

H. N. BURSTEIN, *Examiner.*

R. J. BUTTERMARK, L. M. MILLER,
*Assistant Examiners.*